Patented Apr. 27, 1943

2,317,961

UNITED STATES PATENT OFFICE 2,317,961

METHOD OF PREPARING A CALCINED NON-SLAKING DOLOMITIC MATERIAL FOR REMOVING CARBON DIOXIDE FROM WATER

Frederick Tschirner, Medford, N. J., assignor to Medford Engineering Co., Medford, N. J., a corporation of New Jersey No Drawing. Application May 18, 1940,
Serial No. 336,007

4 Claims. (Cl. 252—175)

This invention relates to the method of manufacturing a basic material suitable for treating natural waters to overcome their corrosive properties; also the material produced by the method; and has for an object the production of improvements in this art.

In modern water supply systems the water is distributed principally in iron pipes, either cast iron or steel, and since the installation and maintenance of an underground pipe system represents a major capital outlay, any factor which tends to destroy or obstruct the pipe system assumes vital importance. The destruction in normal service is caused by the corrosive effects of ingredients present in the water; and obstruction is caused by the deposition of sedimentary matter on the interior walls of the pipes.

Corrosion results from two major causes; first, because of air or oxygen dissolved or entrained in the water; and second, because of free acids or acid reacting salts in the water. The acid condition of the water is usually due to the presence of carbonic acid ($CO_2$), and many methods of treatment have been designed to overcome its corrosive effects.

The methods most commonly employed at present for relieving acidity are aeration and treatment with lime ($CaO$). In the latter method there is added to the water sufficient lime to raise the pH of the water from any point below pH 7 to a pH of 8 or 8.5. The reaction is based upon the elimination of carbonic acid through the formation of calcium carbonate, the increase in pH value being due to the presence of an excess of calcium hydroxide.

The lime treatment has several disadvantages. In the first place it requires constant chemical control in order to insure the proper lime dosage; and in the second place it has been found that the pH value established by the lime treatment is not maintained throughout the distribution system, calcium compounds being deposited as the water passes away from the treating station. The calcium deposits gradually obstruct the flow of water, and moreover, the water becomes more acid (the pH value decreasing) and attacks the iron pipes with the result that red water is obtained at the delivery points.

Among the many methods suggested for correcting the acidity while avoiding the troubles of the lime treatment is one wherein the action of magnesium oxide ($MgO$) is substituted for the action of lime or calcium oxide ($CaO$). In this method there is used a dolomitic limestone ($CO_3.CaCO_3$) which has been furnaced at a low temperature in such a way as to insure the decomposition of the magnesium carbonate to form magnesium oxide, but leaving the calcium carbonate intact. The resulting product is a combination of calcium carbonate and magnesium oxide.

Water which passes through a granular bed of this material dissolves the magnesium oxide with the formation of magnesium bicarbonate, the pH of the water at the same time increasing through the solution of a small quantity of magnesium hydroxide.

According to Scherer (Der Magnesit; 1908) the magnesium carbonate in dolomite dissociates at 500 to 600° C., without any effect upon the calcium carbonate. Shaw and Boles (Amer. Chem. Soc. 5–311, 817; 1922) calcined dolomite of a composition $CaCO_3$ 55.8 and $MgCO_3$ 43.4 at 650 to 700° C., obtaining $CaCO_3$ 70.0 and $MgO$ 25.5.

In practical operations it has been found that when dolomites are roasted at temperatures sufficiently low to insure the formation of magnesium oxide without decomposing the calcium carbonate they possess a comparatively low carbon dioxide absorption capacity. This is a matter of vital importance when comparing operating costs with the lime method. Furthermore, it has been observed that the grains of furnaced dolomite have a tendency to become inactive before they are entirely consumed.

According to the present invention there is produced a dolomitic compound which possesses a higher absorptive value for carbon dioxide and which will not become inactive during use.

As an example of the manner in which the invention may be practiced the following illustration is given. A dolomite containing 54% $CaCO_3$ and 42% $MgCO_3$ and crushed to a size of approximately ⅛″ to ₁⁄₁₆″ mesh, was passed through a rotary kiln and heated by direct flames to a temperature of 780–880° C.; but instead of allowing the material to cool gradually, as is customary, the hot calcined dolomite as it came from the kiln was immediately quenched with sprays of cold water to reduce its temperature to approximately 250° C. After it is cooled to this temperature no further internal interchange of $CO_2$ or action with $CO_2$ of the air can occur.

When prepared in the above manner the product on an average contains 6% $CaO$ and 20% $MgO$, the balance substantially all $CaCO_3$ with the same amount of miscellaneous ingredients as was found in the original dolomite; possesses a high absorption capacity for $CO_2$; and does not become inactive in use, being completely used up without surface hardening.

The quenching operation is not to be confused with that whereby calcium oxide is converted into hydrated lime. At the high temperature of quenching no lime or magnesium hydroxide can be formed. The quenching operation is of particular importance since one of the purposes is the production of a material containing a definite amount of calcium oxide.

When properly furnaced the dolomite grains will not disintegrate during the quenching operation. If furnaced too long at a temperature at which calcium oxide is formed the material will disintegrate when placed in water. The furnacing must therefore be stopped at a point where the proper amount of calcium oxide has been formed, good results being obtained when 4 to 8% is present.

But since it is extremely difficult in the large scale manufacture of the material to completely decarbonate all of the magnesium carbonate at a time when the proper calcium oxide content has been formed, quenching is of vital importance, because if the material is cooled slowly a recarbonation of the calcium oxide will take place through absorption of the carbon dioxide which the undecomposed magnesium carbonate continues to give off. Magnesium carbonate decomposes completely between 546° C. and 600° C., while complete decarbonation of calcium carbonate requires a temperature of 1000° C.

The superior character of the product made according to the present process may be ascribed to the maintenance of the calcium oxide content of the quenched material. Usually it is assumed that the MgO.CaCO$_3$ mineral becomes inactive through the deposition of insoluble iron compounds. The presence of silica has also been considered as harmful. However, the inactivation may also be ascribed to a reaction observed by H. Deville in 1866, namely, that a dolomite burned at such a low temperature as to insure the decomposition of the magnesium carbonate alone and not the calcium carbonate, forms an artificial marble when treated with water, while a calcium oxide content prevents the hardening.

A further advantage of the high-temperature quenching operation lies in the maintenance of an open structure in the dolomite grain. According to Kohlschichten and Feitknecht the primary particles of burnt lime possess more or less the structure of the original substance, but on continued heating aggregate to form secondary particles.

The material produced according to the present invention has given full satisfaction in use. It maintains the water clear at the outlets even at great distances; avoids incrustations in the pipes; and avoids corrosion. Moreover, the grains are completely used up, thus furnishing economy and dependability in service.

While one embodiment of the invention has been described in detail in order to give a proper understanding of the principles of the invention, it is to be understood that the invention may have various embodiments within the limits of the prior art and the scope of the subjoined claims.

I claim:

1. The method of making a prepared non-slaking dolomitic material which is suitable for removing carbon dioxide from water, which is stable in air and non-acid water, and which is completely used up in water containing carbon dioxide, which comprises, heating dolomite of a particle size of approximately $\frac{1}{8}''$ to $\frac{1}{16}''$ to a temperature of about 780 to 880° C. until substantially all the magnesium carbonate is converted to magnesium oxide and about 4 to 8% of calcium oxide is formed from the calcium carbonate, and immediately quenching the hot material with water to reduce its temperature down to about 250° C. where internal exchange of carbon dioxide or effects from carbon dioxide of the air cannot occur.

2. The method of making a prepared non-slaking dolomitic material which is suitable for removing carbon dioxide from water, which is stable in air and non-acid water, and which is completely used up in water containing carbon dioxide, which comprises, heating dolomite of a particle size of approximately $\frac{1}{8}''$ to $\frac{1}{16}''$ in a rotary kiln in the presence of direct flames to a temperature of about 780 to 880° C. until substantially all the magnesium carbonate is converted to magnesium oxide and about 4 to 8% of calcium oxide is formed from the calcium carbonate, and immediately quenching the hot material with water to reduce its temperature down to about 250° C. where internal exchange of carbon dioxide or effects from carbon dioxide of the air cannot occur.

3. As an article of manufacture, a calcined non-slaking dolomitic material for removing carbon dioxide acidity from water, containing approximately 4 to 8% calcium oxide with the remainder calcium carbonate and magnesium oxide, which is substantially insoluble in non-acid water, which will remove carbon dioxide from water, and which is substantially used up in removing carbon dioxide from water.

4. As an article of manufacture a calcined non-slaking dolomite for removing carbon dioxide acidity from water, which was originally composed of about 54% $CaCO_3$ and 42% $MgCO_3$ wherein substantially all the $MgCO_3$ is changed to MgO and approximately 4 to 8% of the $CaCO_3$ is changed to CaO, the balance of the $CaCO_3$ being left uncalcined, which is substantially insoluble in non-acid water, which will remove carbon dioxide from water, and which is substantially used up in removing carbon dioxide from water.

FREDERICK TSCHIRNER.